United States Patent [19]
Schartinger et al.

[11] Patent Number: 5,974,924
[45] Date of Patent: Nov. 2, 1999

[54] CUTTING APPLIANCE FOR LARGE CYLINDRACEOUS OBJECTS

[75] Inventors: Edward J. Schartinger, deceased, late of Cavan, by Anna K Schartinger, executrix; Terry Hunter, Peterborough, both of Canada

[73] Assignee: General Electric Canada Inc, Mississauga, Canada

[21] Appl. No.: 09/038,013

[22] Filed: Mar. 11, 1998

[51] Int. Cl.[6] .......................................................... B23D 5/02
[52] U.S. Cl. ................................ 83/184; 83/185; 83/886; 83/930; 83/946
[58] Field of Search ................................. 83/864, 54, 184, 83/185, 187, 563, 930, 946; 82/59, 70.2, 82, 113, 131

[56] References Cited

U.S. PATENT DOCUMENTS

| | | | |
|---|---|---|---|
| 3,216,295 | 11/1965 | Gill | 82/82 |
| 3,293,963 | 12/1966 | Carroll et al. | 83/54 |
| 3,478,627 | 11/1969 | Marion | 82/70.2 |
| 3,859,877 | 1/1975 | Sherer et al. | 82/82 |
| 4,521,264 | 6/1985 | Mueller | 83/54 X |
| 4,718,201 | 1/1988 | Legge | 83/54 X |
| 5,297,462 | 3/1994 | Creaden | 83/563 X |
| 5,633,902 | 5/1997 | Moscardini et al. | 83/185 X |

*Primary Examiner*—Rinaldi I. Rada
*Assistant Examiner*—Ana Luna
*Attorney, Agent, or Firm*—Edward H. Oldham

[57] ABSTRACT

An internally expanding cutting device is used for severing large cylindraceous objects in two. The device comprises a spider mechanism in which a series of radially extending arms are attached to a central hub. The spider is arranged to be mounted on a base member so that the spider mechanism is free to rotate. A series of self propelled cutting wheels are mounted on the arms of the spider to allow the cutter wheels to contact the interior wall of the cylinder to be cut. The cutting wheels are arranged to drive the spider in a rotational manner while the cutter wheels are progressively pushed outwardly to deepen the cut. Each wheel follows in the track of the previous cutter wheel until the cylinder is severed.

14 Claims, 2 Drawing Sheets

5,974,924

CUTTING APPLIANCE FOR LARGE CYLINDRACEOUS OBJECTS

BACKGROUND OF THE INVENTION

The operation of a traditional pipe cutter used by a plumber is well understood. As the cutter is rotated around the exterior of the pipe, the pipe is progressively grooved by the force of the cutting wheel and the groove deepens with each successive passage of the cutting wheel until the pipe breaks.

A close examination of the above "cutting" process will show that the pipe really is not "cut", but a groove is formed in the pipe by swaging the metal of the pipe at the "cut", and this metal undergoes cold flow as the cutter wheel wedges the metal at the groove apart. The cold flow of the metal in the pipe continues as the cutter forces its way inwardly until the separation force produced by the wedging action of the cutter wheel is sufficient to fracture the portion of the pipe wall remaining at the "cut". If the cutter wheel is operating correctly, there will be practically no swarf produced by the pipe cutter during the "cutting" operation.

The cutting tool of this application functions in a somewhat similar manner but its application is typically found in severing large cylindrical objects which have relatively large diameters and relatively thin walls and which must be "cut" in environments where (in this instance) the cylinder is immersed under several feet of water. The cutting operation for these objects thus progresses (underwater) from the inside surface of the cylindrical wall toward the exterior surface of the wall until the cylinder fractures. This invention may be advantageously applied to applications in the nuclear reactor art where reconfiguring and/or decommissioning of nuclear reactors must be undertaken. The invention may be specifically applied to good advantage in severing such items as pressure vessels or stainless steel shrouds in Boiling Water Reactors (BWR's) which typically have diameters in the order of 12–20 feet and which have a wall thickness from about one to eight inches. The ratio of the cylinder diameter to wall thickness gives some indication of the stability of the cylindrical wall (the higher the number, the greater the flexibility of the wall). For cylinders applicable to this invention, the diameter to thickness ratio may be in the order of 25–150; for a commercial steel pipe used in the plumbing industry the ratio may be as small as 4. It will therefore be apparent that the cylindrical objects to which this invention applies typically have walls which are quite flexible and which may be easily deformed by the application of localized radial force.

In reconfiguring and/or decommissioning BWR's, it is necessary to cut large cylindrical reactor components into pieces in order to make the removal of the component possible as well as to facilitate handling and storage of the cut pieces which may yet be radioactive.

Attempts to cut such components (successfully or otherwise) while the cutting equipment is immersed in substantial depths of water, have included plasma arc torch, Electric Discharge Machining (EDM), Laser cutting devices, water jets and metal cutting saws.

Most of the above devices produce significant amounts of swarf during a cutting operation. In some instances, the swarf is produced as a vapour and in other processes, the swarf consists mainly of small metallic particles. It is easily seen that the production of substantial amounts of radioactive swarf formed during the cutting process, can lead to a very serious and expensive cleanup and containment operation which must be carried out under a substantial height of water.

Other severing techniques, which have been tried with varying degrees of success, appear below.

RELEVANT PRIOR ART

U.S. Pat. No. 4,317,021 Feb. 23, 1982

This patent uses a complex system of a gantry crane and a moveable carriage to focus and reflect a laser beam on to the shroud undergoing dismemberment.

U.S. Pat. No. 5,239,564 Aug. 24, 1993

This patent shows how a radiated component may be cut up into smaller pieces in situ and of how the cut pieces are handled and stored.

U.S. Pat. No. 5,293,412 Mar. 08,1994

Similar to U.S. Pat. No. 5,239,564 above except that the whole reactor component is vertically moved by forces exerted on the bottom of the reactor. Cutting is accomplished by a mechanical abrasion techniques similar to the above.

U.S. Pat. No. 5,301,212 Apr. 05, 1994

Similar to U.S. Pat. Nos. 5,293,412 and 5,239,564 above whereas the reactor component is displaced vertically as the cutting process proceeds.

U.S. Pat. No. 5,329,562 Jul. 12, 1994

This patent provides a wire saw having diamond grains to cut a reactor, previously grouted with cement, into pieces suitable for handling and storage.

U.S. Pat. No. 5,203,244 Apr. 20, 1993

This patent provides an excellent example of the prior art technique for cutting up a large reactor component similar to the component being dissected by applicant's apparatus. A rotatable turret is mounted on a supporting structure rigidly fixed at the top of the reactor structure and secured at the lower end by three jacking devices which center and hold the rotatable turret in a centered position. The jacking devices absorb any reaction forces transferred to the support structure from the cutting device and transmit it to the walls of the reactor.

This device uses one or two saws to cut the reactor components into pieces small enough to permit the pieces to be handled. A saw which produces a horizontal cut is used to slice a "ring" from the reactor cylinder and another saw slices the "ring" into pieces by making a series of vertical slices in the "ring".

In some installations, the same saw is used for both cuts by changing its orientation.

It will be seen that the above patent produces pieces by sawing the tubular shaped reactor body in horizontal and vertical slices. The force necessary to push the saw into the work absorbed by the supporting structure at the top and bottom of the reactor.

SUMMARY OF THE INVENTION

The device of this invention is used to "cut" a tubular shaped reactor body (preferably a pressure vessel or shroud of a BWR) into a series of rings (which may later be sliced into segments) by means of an internally expanding tube cutter.

A platform is installed within the cylindrical body to be "cut" and a cutting apparatus is mounted on the platform so as to be rotatably supported thereon within the tubular shaped reactor body.

The cutting apparatus comprises a series of radially extending arms which are arranged to have a series of self propelled cutting wheels supported thereon so that each wheel is able to contact the inside surface of the interior wall of the tubular shaped reactor body. The cutter wheels are evenly spaced around the inner surface of the reactor body and all the wheels are carefully mounted so that all wheels contact the tubular body in the same plane.

Each cutter wheel is self propelled, that is, each cutter wheel is driven to rotate at the same speed against the inside surface of the tubular reactor body. The apparatus has means incorporated therein to advance the cutting wheels into the surface of the cylindrical reactor body to produce a "cut" which is progressively deepened by the passage of each cutter wheel in the cut.

The cutting operation progresses until the "cut" has sufficient depth that the remaining wall portion fractures and the reactor body is severed in two.

It is an object to supply an underwater cutting apparatus for a large cylindrical reactor component which provides a severing action which produces a minimum of swarf.

It is also an object of this invention to provide a "cutting" apparatus for a large cylindrical reactor body which produces a "cut" in the component by the action of a plurality of rotating coplanar cutter wheels mounted in the cutting apparatus so as to track one another in a progressive cutting operation.

It is another object of this invention to provide a "cutting" apparatus which utilizes driven cutter wheels to cause the entire cutting apparatus to rotate around a cylindrical reactor body.

It is yet another object of this invention to provide an apparatus for cutting a large cylindrical reactor body, which is secured to the interior of the body by clamping mechanism and which produces no reaction force at the clamping mechanism (such as would be produced by a cutting apparatus in which the cutter wheels are driven by rotation of the cutter assembly inside the reactor body).

It is yet another object of this invention to cut a large cylindrical reactor body in two within a period of time that is much shorter than previously deemed possible.

DESCRIPTION OF THE PREFERRED EMBODIMENTS

Figure 1:
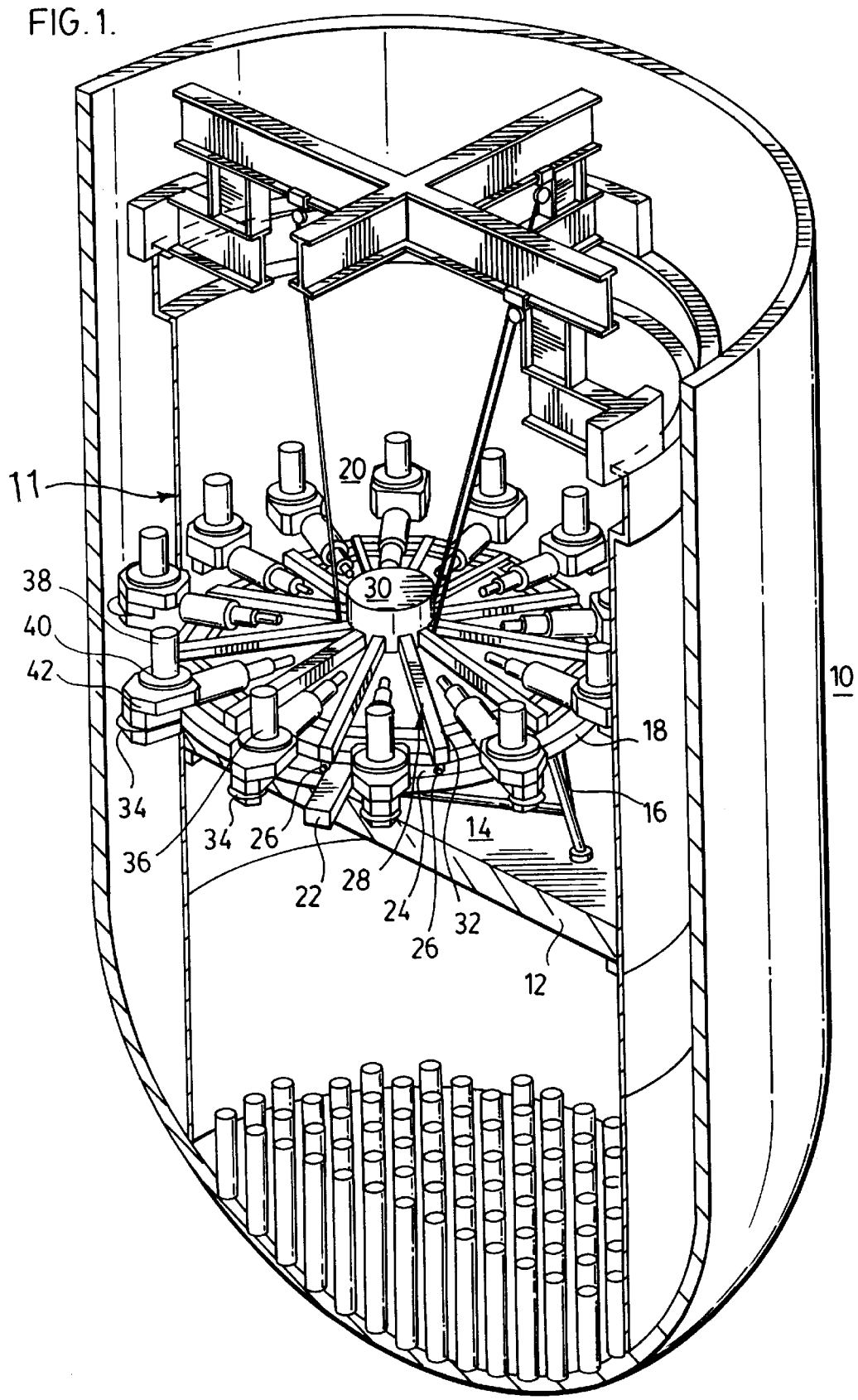
FIG. 1 is a sectional perspective view of a pressure vessel of a nuclear reactor having a shroud constructed therein showing the cutter apparatus of this invention in place.

FIG. 1 shows a pressure vessel 10 of a BWR with in which is mounted within a shroud 11. Shroud 11 is generally a stainless steel cylindrical body having an internal diameter of about sixteen feet and a thickness of approximately 1.5 inches.

The shroud 11 is usually provided with at least one plate such as the platform 12 which could be a fuel tube core plate which was originally part of the reactor or platform 12 may be specifically fabricated for insertion into the shroud to provide a stable base for the cutting operation.

A support assembly 14, comprises legs 16 on which rests a circular support assembly 18 which is provided to support the rotating cutting wheel apparatus 20 thereon. Assembly 18 is installed in the shroud 11 on legs 16 so that its top surface is orthogonal to the shroud axis. A plurality of radially extendible locating arms 22 are mounted in support assembly 18. These arms serve to locate and stabilize the support assembly 18 at its proper location in the shroud 11.

Support assembly 18 is also provided with a circular track surface 24 on which rollers 26 of cutting apparatus 20 are permitted to roll.

Cutting apparatus 20 comprises a rigid spider structure 28 comprising hub 30 and radially extending arms 32 between which the cutter wheels 34 and cutter drive mechanisms 36 are mounted.

The cutter drive mechanism in this instance comprises drive motors 38, gear reduction units 40, and coupling devices 42.

Figure 2:
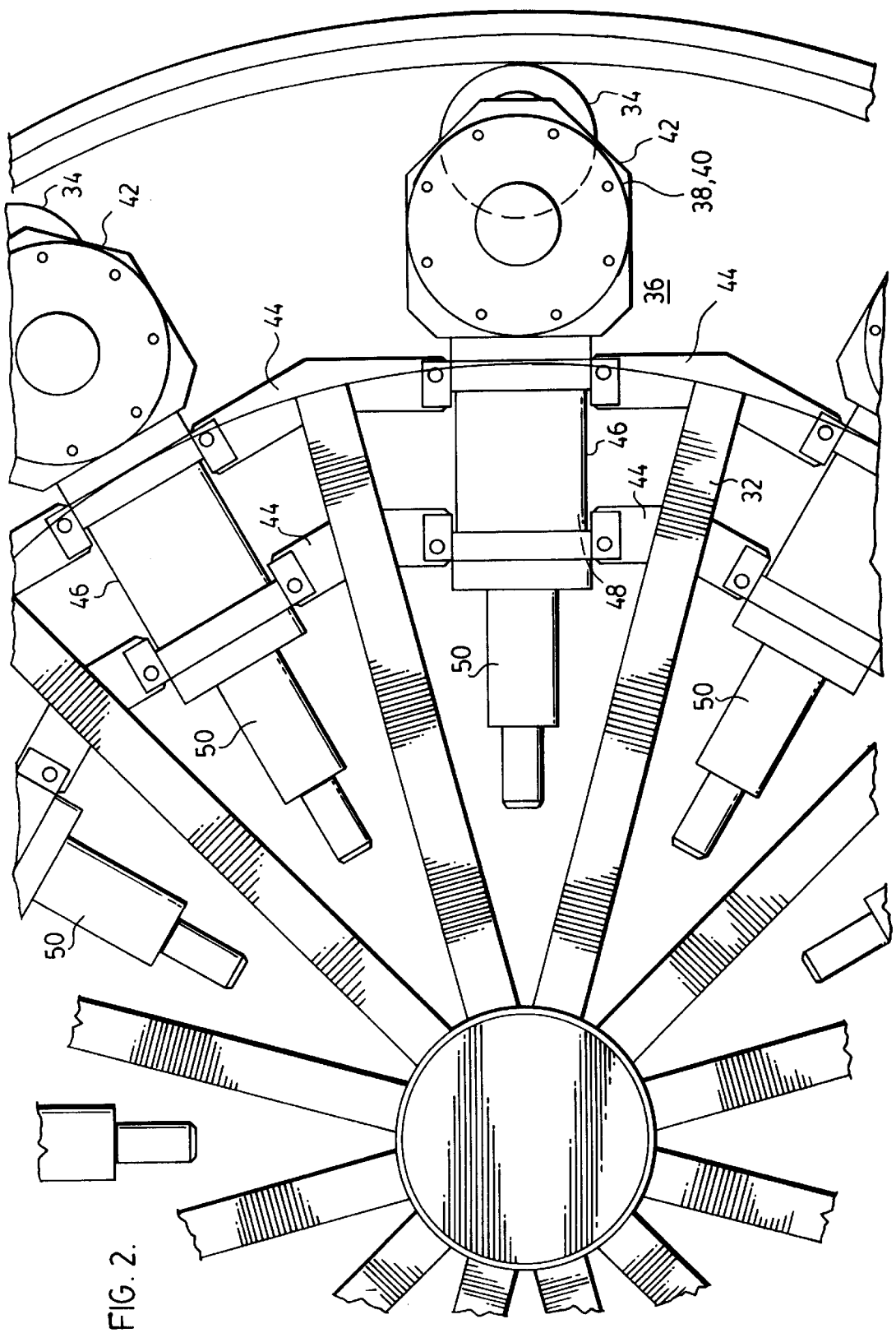
FIG. 2 is a perspective of an individual cutting wheel apparatus.

FIG. 2 shows the mounting assembly for the cutter mechanisms 36. Arms 32 are provided with mounting flanges 44 to which hydraulic actuating cylinders 46 are mounted. Cylinders 46 house piston and rod assemblies 48 and 50 respectively which serve to accurately guide cutter assemblies 36 in their radial travel in the cutter mechanism 20. Piston and rod assemblies 48 and 50 must be stabilized against axial twisting along the axis of rod 50. Any rotation of the cutter mechanism 36 about the axis of rod 50 leads to improper tracking of wheels 34 in the cutting groove and ultimately to cutter wheel fracture.

Cutter mechanism 20 must be capable of being lifted by crane etc. thus the arms 32 and the hub 30 must be physically robust.

Power will be supplied by an umbilical cord to the cutter apparatus 20, likewise the supply of pressurized hydraulic fluid to cylinders 46.

In operation, the device is installed and operated as follows:

Legs 16 are installed in shroud 11 if a suitable core plate 12 exists in the shroud. Cutting apparatus 20 and support assembly 18 are lowered through 60–80 feet of water to rest on legs 16. Locating arms 22 are extended to contact the interior wall surface of the shroud 11 and center the support assembly 18 in the shroud 11. If a plate, such as core plate 12, does not exist in the reactor, a support plate similar to core plate 12 will be installed in the vessel.

Unit 20 is supplied with both hydraulic power and electrical power so that upon actuation, the hydraulic cylinders advance the cutter mechanisms 36 in concert radially outwardly until wheels 34 contact the interior surface of shroud 11.

At this time, motors 38 are energized and wheels 34 are driven (in the same direction) to cause unit 20 to begin to rotate. Rotation continues through a predetermined arc (say 120°) and the motors 38 are reversed and unit 20 reverses rotation. The hydraulic pressure is increased to the cylinders 46 and the wheels 34 begin to penetrate the shroud. The pressure to cylinders 46 is constant and as the unit 20 oscillates, the cut progressively deepens until the shroud undergoes fracture.

At this time, the cutter mechanisms 36 may be retracted or the severed portion of the shroud 11 may be removed from the balance of the shroud 11 with the cutting apparatus 20 still in place.

Typical sizes for the apparatus are as follows for severing a stainless steel shroud having a diameter of sixteen feet and a thickness of one and one half inches:

number of cutter mechanisms: 12 cutter wheel diameter: 12"

cutter wheel pressure: 60 tons cutter wheel torque requirement: 2000 foot-pounds The time required to sever the stainless steel shroud: less than 2 hours.

Swarf produced—negligible.

Those skilled in the art will no doubt recognize that many alternatives are possible after having seen the apparatus disclosed.

Electric drive motors were chosen for this application because of the simplicity of control and availability of supply. No doubt hydraulic motors may be adapted for this application. Hydraulic rams, which could be easily mounted on the arms 32 and stabilized against rotational twisting, were chosen for those reasons. Mechanical jacking apparatus may be more convenient for applying pressure to the cutter wheels in some applications.

In some applications, it may be desirable to provide a pivot bearing as a reference to keep hub 30 centered in the shroud or cylindrical member undergoing cutting.

In any event, applicant wishes to limit the coverage of the instant invention only by the scope of the following claims.

It is claimed:

1. Apparatus for producing a separation in the wall of a large cylindrical vessel by swaging a groove in said wall in a plane orthogonal to the axis of said vessel comprising:

a support assembly for supporting said apparatus mounted at a predetermined location within said vessel, swaging wheel means mounted on said support assembly for rotation thereon wherein said swaging wheel means comprises a plurality of spaced swaging wheels mounted on a rotatable spider assembly in such a manner as to allow said swaging wheels to be pushed radially outwardly on spider assembly to contact said wall and swage a groove in said wall, drive means associated with said swaging wheels capable of producing bidirectional rotation of said swaging wheels to, drive said spider assembly in an oscillatory fashion within said vessel and sever said wall by swaging.

2. Apparatus as claimed in claim 1 wherein said swaging wheels are moved outwardly or inwardly in concert.

3. Apparatus as claimed in claim 1 wherein said swaging wheels are driven in the same direction in concert, so as to cause said spider assembly to rotate within said vessel.

4. Apparatus as claimed in claim 3 wherein said swaging wheels are moved inwardly and outwardly on said spider assembly in concert.

5. Apparatus as claimed in claim 4 wherein said swaging wheel means comprises at least two swaging wheels.

6. Apparatus as claimed in claim 4 wherein said spider assembly comprises a plurality of radially extending arms connected to a central hub, and each arm is provided with bearing means to contact said support assembly and permit said swaging wheel means to rotate thereon.

7. Apparatus as claimed in claim 1 wherein said drive means comprises an electric motor.

8. Apparatus as claimed in claim I wherein said drive means comprises a hydraulic motor.

9. Apparatus as claimed in claim 1 wherein said drive means is pneumatic.

10. Apparatus as claimed in claim 1 wherein said drive means is mechanical.

11. Apparatus for the production of a progressive circular groove in the wall of a large cylindrical vessel, comprising:

a platform assembly of a suitable shape to fit within said vessel, wall engaging means on said platform to contact said wall of said vessel to stabilize said platform in said vessel in a predetermined location, grooving means for ultimately severing the wall of said vessel comprising a plurality of driven swaging wheels having a wedge shaped cross section mounted about a central axis of a rotatable structure resting on said platform assembly and wherein said swaging wheels are movable outwardly in a radial direction in concert such that the swaging wheels are located at substantially the same radial distance from the central axis of said rotatable structure during a cutting operation, said swaging wheels producing rotation of said rotatable structure upon contact with said wall.

12. Apparatus as claimed in claim 11 where said swaging wheels move progressively outwardly to cut said wall.

13. Apparatus as claimed in claim 12 wherein said rotatable structure comprises a spider assembly having a plurality of spaced radial arms emanating from a common hub.

14. Apparatus for producing a severing cut by swaging a groove in a large cylindrical vessel comprising:

circle cutting apparatus mounted in said vessel comprising a series of substantially evenly spaced driven swaging wheels mounted on rotatable apparatus for causing rotation of said rotatable apparatus inside said vessel during periods when said swaging wheels contact the wall of said vessel, said driven swaging wheels having drive means associated therewith comprising an electric motor coupled to speed reduction gear boxes which are coupled to each swaging wheel, hydraulic cylinder means mounted on said rotatable apparatus for forcing each swaging wheel radially outwardly to produce a cut by swaging a groove in said wall.

\* \* \* \* \*